US012682515B2

(12) United States Patent
Sagong et al.

(10) Patent No.: US 12,682,515 B2
(45) Date of Patent: Jul. 14, 2026

(54) METHOD AND DEVICE WITH IMAGE GENERATION BASED ON NEURAL SCENE REPRESENTATION

(71) Applicants:Samsung Electronics Co., Ltd., Suwon-si (KR); POSTECH Research and Business Development Foundation, Pohang-si (KR)

(72) Inventors: Donghoon Sagong, Suwon-si (KR); Haechan Lee, Pohang-si (KR); Sunghyun Cho, Pohang-si (KR); Seung-Hwan Baek, Pohang-si (KR); Nahyup Kang, Suwon-si (KR); Jiyeon Kim, Suwon-si (KR)

(73) Assignees: SAMSUNG ELECTRONICS CO., LTD., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 196 days.

(21) Appl. No.: 18/466,143

(22) Filed: Sep. 13, 2023

(65) Prior Publication Data

US 2024/0290007 A1      Aug. 29, 2024

(30) Foreign Application Priority Data

Feb. 23, 2023      (KR) ........................ 10-2023-0024213
May 30, 2023      (KR) ........................ 10-2023-0069317

(51) Int. Cl.
*G06T 11/10*      (2026.01)
*G06T 7/90*      (2017.01)
(Continued)

(52) U.S. Cl.
CPC ................ *G06T 11/10* (2026.01); *G06T 7/90* (2017.01); *G06T 15/205* (2013.01); *G06T 17/10* (2013.01);
(Continued)

(58) Field of Classification Search
CPC ....... G06T 11/001; G06T 7/90; G06T 15/205; G06T 17/10; G06T 2207/10012;
(Continued)

(56) References Cited

U.S. PATENT DOCUMENTS 11,062,471 B1      7/2021   Zhong et al.
11,189,043 B2      11/2021  McCombe et al.
(Continued)

FOREIGN PATENT DOCUMENTS

KR            10-2260975 B1      6/2021
KR            10-2455632 B1      10/2022

OTHER PUBLICATIONS

Johari, Mohammad Mahdi, Yann Lepoittevin, and FranÃ§ois Fleuret. "Geonerf: Generalizing nerf with geometry priors." Proceedings of the IEEE/CVF Conference on Computer Vision and Pattern Recognition. 2022. (Year: 2022).*
(Continued)

*Primary Examiner* — Kee M Tung
*Assistant Examiner* — Nauman U Ahmad
(74) *Attorney, Agent, or Firm* — MORGAN, LEWIS & BOCKIUS LLP

(57)                    ABSTRACT

A processor-implemented method includes: extracting pyramid level color feature maps from two or more images; extracting pyramid level density feature maps based on a cost volume generated based on the color feature maps; generating neural scene representation (NSR) cube information representing a three-dimensional (3D) space based on the color feature maps and the density feature maps; and
(Continued)

generating a two-dimensional (2D) scene of a field of view (FOV) different from a FOV of the two or more images based on the NSR cube information.

20 Claims, 10 Drawing Sheets

(51) Int. Cl.
    *G06T 15/20*         (2011.01)
    *G06T 17/10*         (2006.01)
(52) U.S. Cl.
    CPC .............. *G06T 2207/10012* (2013.01); *G06T 2207/10024* (2013.01); *G06T 2207/20084* (2013.01)
(58) Field of Classification Search
    CPC . G06T 2207/10024; G06T 2207/20084; G06T 15/20; G06T 17/00; G06T 11/10; G06N 3/045
    See application file for complete search history.

(56)           References Cited

U.S. PATENT DOCUMENTS

| | | | | |
|---|---|---|---|---|
| 11,308,659 | B2 | 4/2022 | Duckworth et al. | |
| 11,514,660 | B1 * | 11/2022 | Yang ...................... | G06V 10/42 |
| 2018/0293737 | A1 * | 10/2018 | Sun ......................... | G06T 7/207 |
| 2021/0065393 | A1 * | 3/2021 | Jeon ........................ | G06T 7/593 |
| 2021/0113146 | A1 * | 4/2021 | Pogue ................. | A61B 5/0075 |
| 2021/0225015 | A1 * | 7/2021 | Shi ............................ | G06T 7/33 |
| 2022/0230276 | A1 * | 7/2022 | Clark ................... | G06N 3/0455 |
| 2022/0301216 | A1 * | 9/2022 | Yang ...................... | G06N 20/00 |
| 2023/0196690 | A1 * | 6/2023 | Watson ................. | G06T 19/006 |
| | | | | 345/633 |
| 2024/0013485 | A1 * | 1/2024 | Millin ..................... | G06T 17/05 |
| 2024/0104822 | A1 * | 3/2024 | Rao ........................ | G06T 15/005 |
| 2024/0202497 | A1 * | 6/2024 | Ge ........................ | G06N 3/0464 |

OTHER PUBLICATIONS

Mildenhall, Benjamin. Neural Scene Representations for View Synthesis. Diss.EECS Department, University of California, Berkeley, 2020. (Year: 2020).*

Xie, Jian. "Shift Convolution Network for Stereo Matching." arXiv preprint arXiv: 1911.08896 (2019). (Year: 2019).*

Chen et al. "MVSNeRF: Fast Generalizable Radiance Field Reconstruction from Multi-View Stereo" *Proceedings of the IEEE/CVF International Conference on Computer Vision*. 2021 (pp. 14124-14132).

Johari et al. "GeoNeRF: Generalizing NeRF with Geometry Priors" *Proceedings of the IEEE/CVF Conference on Computer Vision and Pattern Recognition*. 2022 (pp. 18365-18375).

Chu et al. "NAFSSR: Stereo Image Super-Resolution Using NAFNet" *Proceedings of the IEEE/CVF Conference on Computer Vision and Pattern Recognition*. 2022 (pp. 1239-1248).

Mildenhall et al. "NeRF: Representing Scenes as Neural Radiance Fields for View Synthesis" *Communications of the ACM*, vol. 65 No. 1, Jan. 2022 (pp. 99-106).

* cited by examiner

METHOD AND DEVICE WITH IMAGE GENERATION BASED ON NEURAL SCENE REPRESENTATION

CROSS-REFERENCE TO RELATED APPLICATIONS

This application claims the benefit under 35 USC § 119(a) of Korean Patent Application No. 10-2023-0024213 filed on Feb. 23, 2023, and Korean Patent Application No. 10-2023-0069317 filed on May 30, 2023, in the Korean Intellectual Property Office, the entire disclosures of which are incorporated herein by reference for all purposes.

BACKGROUND

1. Field

The present disclosure relates to a method and device with image generation based on neural scene representation (NSR).

2. Description of Related Art

A fundamental goal of computer graphics is a photorealistic synthesis of an image and a video. Some methods and representations may simulate an imaging model of a real camera, including processing complex materials and global illumination. These methods may simulate light propagation from a light source to a virtual camera for synthesis based on the law of physics. For this, all physical parameters of a scene may need to be determined in a rendering process. The parameters may include, for example, information about material properties (e.g., reflectivity or opacity) and scene geometry. When such information is provided, ray-tracing techniques may generate photorealistic images. In addition to the physics-based rendering methods, there are techniques based on mathematical approximation close to a real imaging model.

For example, neural rendering may transform scene parameters into an output image, using a neural network. The scene parameters may be provided directly to the neural network as a one-dimensional (1D) input or provided as a two-dimensional (2D) input generated using a classical computer graphics pipeline. A deep neural network (DNN) may observe a real scene and learn how to model and render the scene. The DNN may be construed as a general-purpose function approximator. Neural scene representation (NSR) data generated based on the neural rendering may be used to generate a 2D scene image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: extracting pyramid level color feature maps from two or more images; extracting pyramid level density feature maps based on a cost volume generated based on the color feature maps; generating neural scene representation (NSR) cube information representing a three-dimensional (3D) space based on the color feature maps and the density feature maps; and generating a two-dimensional (2D) scene of a field of view (FOV) different from a FOV of the two or more images based on the NSR cube information.

The two or more images may be images captured by cameras positioned within a critical distance from each other.

The two or more images may be images captured by cameras having optical axes parallel to each other.

The extracting of the color feature maps may include: performing feature extraction on a first image among the two or more images, based on data generated by feature extraction performed on a second image among the two or more images; and performing feature extraction on the second image based on the data generated by the feature extraction on the first image.

The extracting of the color feature maps may include: refining a feature map of a layer of a first feature extraction network for a first image using a feature map of a layer of a second feature extraction network for a second image; and generating a feature map to be propagated to a subsequent layer of the first feature extraction network.

The method may include: generating an epipolar attention map based on the feature map of the layer of the first feature extraction network and the feature map of the layer of the second feature extraction network; and generating feature maps for the subsequent layer of the first feature extraction network and a subsequent layer of the second feature extraction network based on the epipolar attention map.

The extracting of the color feature maps may include performing epipolar attention on three or more images comprising the two or more images by performing feature extraction on a first image among the three or more images based on a result of feature extraction performed on a second image among the three or more images and feature extraction performed on a third image among the three or more images.

The extracting of the density feature maps may include: generating a cost volume based on a correlation for each pyramid level between color feature maps extracted from a first image and color feature maps extracted from a second image; and generating a density feature map for a corresponding pyramid level based on the cost volume.

The generating of the NSR cube information may include generating the NSR cube information by storing, in each position in the 3D space, an NSR statistical value of color feature maps and density feature maps extracted from images of a plurality of viewpoints in the same 3D space.

The generating of the 2D scene may include: determining an NSR parameter from the NSR cube information for each of positions in the 3D space along a view direction from a pixel of the 2D scene; determining a pixel value of the pixel by performing volume rendering based on NSR parameters of the positions in the 3D space along the view direction; and reconstructing the 2D scene by performing volume rendering on pixels of the 2D scene.

In one or more general aspects, an electronic device includes: one or more processors configured to: extract pyramid level color feature maps from two or more images; extract pyramid level density feature maps based on a cost volume determined based on the color feature maps; generate neural scene representation (NSR) cube information representing a three-dimensional (3D) space based on the color feature maps and the density feature maps; and generate a two-dimensional (2D) scene of a field of view (FOV) different from a FOV of the two or more images based on the NSR cube information.

The two or more images may be images captured by either one or both of: cameras positioned within a critical distance from each other; and cameras having optical axes parallel to each other.

For the extracting of the color feature maps, the one or more processors may be configured to: perform feature extraction on a first image among the two or more images, based on data generated by feature extraction performed on a second image among the two or more images; and perform feature extraction on the second image based on the data generated by the feature extraction on the first image.

For the extracting of the color feature maps, the one or more processors may be configured to: refine a feature map of a layer of a first feature extraction network for a first image using a feature map of a layer of a second feature extraction network for a second image; and generate a feature map to be propagated to a subsequent layer of the first feature extraction network.

The one or more processors may be configured to: generate an epipolar attention map based on the feature map of the layer of the first feature extraction network and the feature map of the layer of the second feature extraction network; and generate feature maps for the subsequent layer of the first feature extraction network and a subsequent layer of the second feature extraction network based on the epipolar attention map.

For the extracting of the color feature maps, the one or more processors may be configured to perform epipolar attention on three or more images comprising the two or more images by performing feature extraction on a first image among the three or more images based on a result of feature extraction performed on a second image and feature extraction performed on a third image among the three or more images.

For the extracting of the density feature maps, the one or more processors may be configured to: generate a cost volume based on a correlation for each pyramid level between color feature maps extracted from a first image and color feature maps extracted from a second image; and generate a density feature map for a corresponding pyramid level based on the cost volume.

For the generating of the NSR cube information, the one or more processors may be configured to generate the NSR cube information by storing, in each position in the 3D space, an NSR statistical value of color feature maps and density feature maps extracted from images of a plurality of viewpoints in the same 3D space.

For the generating of the 2D scene, the one or more processors may be configured to: determine an NSR parameter from the NSR cube information for each of positions in the 3D space along a view direction from a pixel of the 2D scene; determine a pixel value of the pixel by performing volume rendering based on NSR parameters of the positions in the 3D space along the view direction; and reconstruct the 2D scene by performing volume rendering on pixels of the 2D scene.

In one or more general aspects, a processor-implemented method includes: generating feature maps for a layer of a first feature extraction network and a layer of a second feature extraction network, respectively based on a first image and a second image; generating an attention map based on the feature maps; generating subsequent feature maps for a subsequent layer of the first feature extraction network and a subsequent layer of the second feature extraction network, based on the attention map; determining a three-dimensional (3D) space based on the subsequent feature maps; and generating a two-dimensional (2D) scene of a field of view (FOV) different from a FOV of the first image and the second image based on the determined 3D space.

Other features and aspects will be apparent from the following detailed description, the drawings, and the claims.

Figure 1:
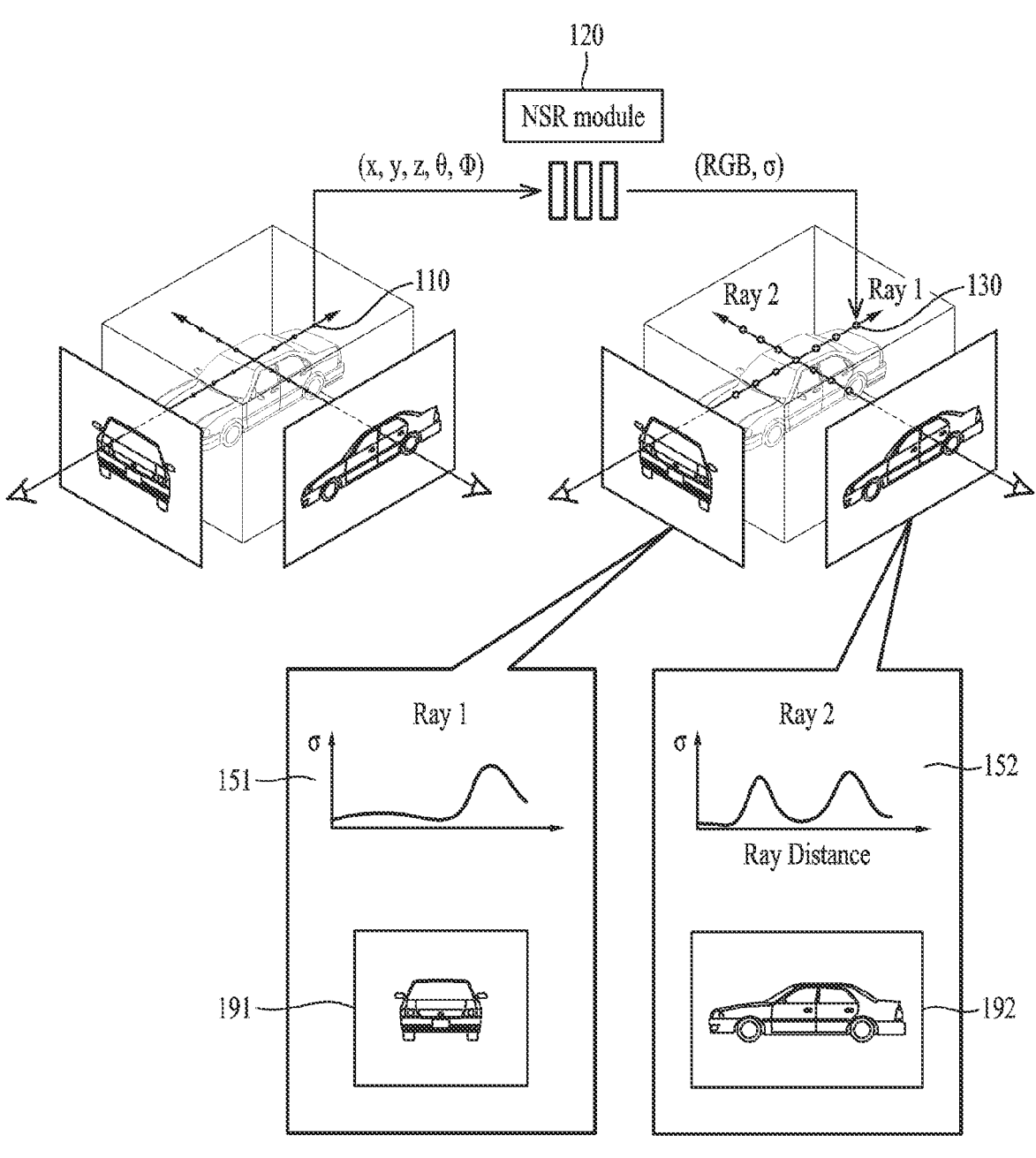
FIG. 1 illustrates an example of a neural scene representation (NSR) according to one or more example embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto is omitted.

FIG. 1 illustrates an example of a neural scene representation (NSR) according to one or more example embodiments.

According to an example embodiment, points in a three-dimensional (3D) space may be represented by NSR data. For example, an electronic device (e.g., an electronic device 1000 of FIG. 10) may generate NSR data 130 of a corresponding point based on an NSR module 120, from a query input 110 of each point in a 3D space. The NSR module 120 may be a module that is configured through training to output the NSR data 130 from the query input 110, and may include a neural network, for example.

For each point in the 3D space, the query input 110 may include coordinates representing the point in the 3D space and a view direction. The view direction may represent a direction (e.g., Ray 1 or Ray 2 of FIG. 1) passing through a pixel and/or points corresponding to the pixel from a viewpoint facing a two-dimensional (2D) scene to be synthesized and/or reconstructed. As an example of the query input 110, coordinates $(x, y, z)$ and direction information $(\theta, \phi)$ are illustrated in FIG. 1. In this example, $(x, y, z)$ may represent coordinates according to the Cartesian coordinate system based on a predetermined origin point, and $(\theta, \phi)$ may represent angles formed between two reference axes (e.g., a positive direction of the z-axis and a positive direction of the x-axis) and the view direction. However, the coordinate system and the view direction of the query input 110 are not limited to those described above.

The NSR data 130 may be data representing a scene of the 3D space viewed from a plurality of view directions and may include, for example, neural radiance field (NeRF) data. The NSR data 130 may include an NSR parameter for each point in the 3D space and each view direction, and an NSR feature for each point.

The NSR parameter may include color information and a volume density (e.g., 151 and 152) (hereinafter simply referred to as a density). The color information may include color values according to a color space (e.g., a red value, a green value, and a blue value according to a red, green, blue (RGB) color space). The color information may be dependent on a view direction. The density (e.g., 151 and 152), $\sigma$, of a point may be interpreted as a probability (e.g., a differential probability) that a ray ends at an infinitesimal particle of the point. In graphs of the densities 151 and 152 shown in FIG. 1, a horizontal axis may indicate a distance from a viewpoint along a view direction, and a vertical axis may indicate a value of a density according to each distance. As will be described in examples below, a color value (e.g., an RGB value) may also be determined for each ray distance along a view direction.

The NSR feature, which may be abstracted information of the NSR data 130 (e.g., the NSR parameter), may include an abstracted value of a color component and an abstracted value of a density component at a point in the 3D space. For example, referring to FIG. 8, an NSR feature of the density component (e.g., any of NSR features 891-1, 891-2, and 891-3) may be a 3D feature map which is a result of a transformation operation on a density feature map for each viewpoint, and an NSR feature of the color component (e.g., any of NSR features 893-1, 893-2, and 893-3) may be a 3D feature map which is a result of a transformation operation on a color feature map. The NSR feature of the color component may be an abstracted value of the color component for all view directions at a corresponding point (e.g., a corresponding voxel) in the 3D space. The density component may be independent of an original view direction. The NSR feature may be converted into the NSR parameter (e.g., the color value and the density value) by a neural renderer, examples of which will be described below.

Storing the NSR data 130 may correspond to training the NSR module 120 (e.g., the neural network) with 3D scene information, and loading the NSR data 130 may correspond to inputting the query input 110 to the NSR module 120 and outputting the NSR data 130 (e.g., the NSR parameter). The NSR module 120 may include NSR cube information and a neural renderer.

A space corresponding to a 3D scene may be constructed as a 3D grid, and the NSR data 130 for a corresponding voxel position may be pre-computed and stored for each voxel position in the grid. The NSR data 130 stored in the 3D grid or a collection of information derived from the NSR data 130 may also be referred to as an NSR data cube or NSR cube information. The NSR cube information may include information about a pre-computed NSR feature and may include, for example, a statistical value (e.g., mean and variance) of multi-view NSR features. The statistical value of the multi-view NSR features will be referred to hereinafter as an NSR statistical value. However, examples are not limited thereto, and the NSR cube may store the NSR parameter itself. In this case, a color value of the NSR parameter may be stored separately for each view direction, and also for each voxel position.

In an example embodiment, the neural renderer of the electronic device may generate a 2D image from NSR cube information. The neural renderer may include a neural network and a volume rendering operation. The electronic device may determine NSR parameters of points according to a view direction in a 3D space from the NSR cube information based on the neural network. For example, the electronic device may determine (or select) an NSR statistical value (e.g., a color mean and variance and a density mean and variance) of a point (e.g., a voxel position) corresponding to the query input 110 in the NSR cube information. For example, when an NSR statistical value of a point indicated by the query input 110 is not pre-computed, the electronic device may determine an NSR statistical value corresponding to the query input 110 based on an NSR statistical value of an adjacent point. The electronic device may calculate or compute the NSR statistical value corresponding to the query input 110 based on interpolation of the NSR statistical value of the adjacent point. The electronic device may output the NSR parameter corresponding to the query input 110 from the NSR statistical value corresponding to the point and the view direction, using a neural network for generating the NSR parameter. The neural network, which is designed and trained to output a color mean and variance and a density mean and variance corresponding to a requested sample point and output a color value and a density value of the sample point from a view direction (e.g., a view vector), may include a multi-layer perception (MLP) structure. Accordingly, the neural renderer may output an RGB value and a density (e.g., 151 and 152) of the sample point in response to an input value (e.g., x, y, z, $\theta$, $\phi$ of the sample point).

For example, a view direction may be defined for each pixel of a 2D scene image (e.g., 191 and 192), and an output value (e.g., NSR parameters) of all sample points in the view direction may be computed through NSR cube information and a neural network operation. The electronic device may perform volume rendering, examples of which will be described below, on the NSR parameters of all the sample points in the view direction to determine a pixel value corresponding to the view direction. The determining of the pixel value for all pixels in the 2D scene image may be repeated to generate a scene image. FIG. 1 illustrates 2D scene images 191 and 192 with respect to a view from the front of an object which is a vehicle and a view from the side of the object.

The electronic device may generate a 2D scene image represented by NSR cube information and obtained by viewing a 3D space from an arbitrary new viewpoint, such that the image has a photorealistic level of quality. When obtaining at least two images (e.g., a pair of images), the electronic device may construct the NSR cube information described above. Accordingly, when capturing a pair of images using a stereo camera, the electronic device may immediately generate a new scene image based on an NSR from the pair of images. Without a need to train neural networks for the NSR with each scene (e.g., a scene viewing a 3D space from an arbitrary position in an arbitrary view direction), the electronic device may immediately estimate a 3D scene based on NSR cube information obtained (e.g., determined) in an inference process performed once. In addition, as the electronic device captures a scene from multiple viewpoints using a camera (e.g., a stereo camera), NSR data (e.g., an NSR statistical value) may be accumulated in the NSR cube information of the same 3D space. This NSR data accumulation may enable images from more diverse viewpoints to be reconstructed with higher resolution.

Figure 2:
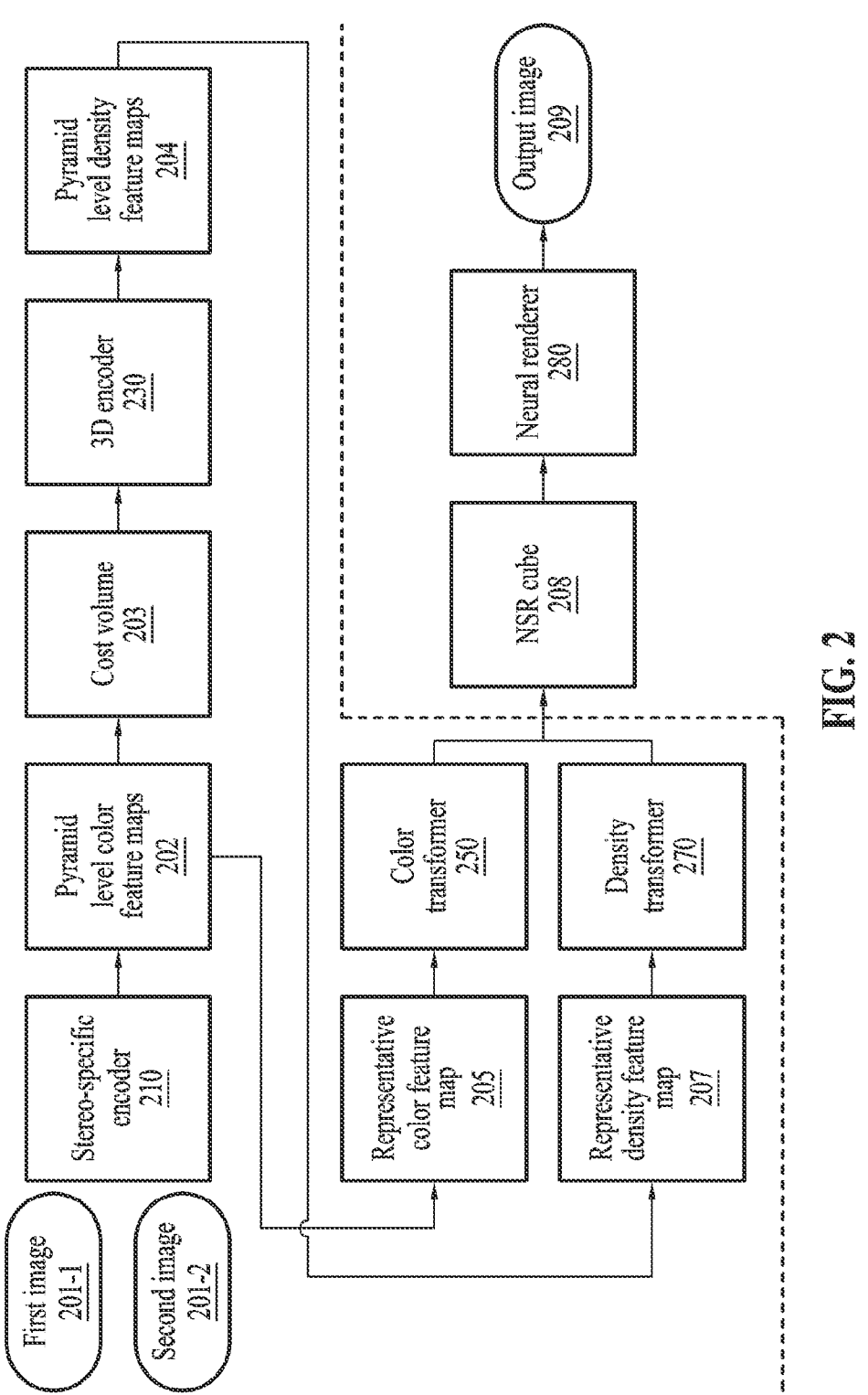
FIG. 2 illustrates an example of NSR cube construction and neural rendering according to one or more example embodiments.

FIG. 2 illustrates an example of NSR cube construction and neural rendering according to one or more example embodiments.

According to an example embodiment, the electronic device may include a plurality of components that include and implement models (e.g., neural networks) for constructing an NSR cube 208 and reconstructing a scene image. For example, the electronic device may include a stereo-specific encoder 210, a 3D encoder 230, a color transformer 250, a density transformer 270, the NSR cube 208, and a neural renderer 280. The stereo-specific encoder 210, the 3D encoder 230, the color transformer 250, the density transformer 270, and the neural renderer 280 may include pre-trained neural networks, for example, trained before obtaining a scene image of a 3D space. The NSR cube 208 may be constructed for each 3D space that is a target of scene reconstruction. For example, when reconstructing a scene of a new 3D space, the electronic device may newly construct and use the NSR cube 208 from a pair of images captured from the new 3D space.

For training the foregoing models (e.g., the neural networks), an image capturing position (e.g., a camera position) and a camera intrinsic parameter may be used. This is because a view direction corresponding to pixels within a field of view (FOV) may be identified from a viewpoint corresponding to each image. A viewpoint may correspond to a position of a camera that captures a corresponding image. An FOV may be a range corresponding to a viewing angle of the camera. When the electronic device uses a stereo camera, there may be given relative positions of each camera module of the stereo camera that captures a corresponding stereo image and given intrinsic parameters of the camera. The stereo-specific encoder 210, the 3D encoder 230, the color transformer 250, the density transformer 270, and the neural renderer 280 may train the neural networks such that they output an output image 209 which is the same as an input image, when they reconstruct a 3D scene learned from a position where the input image is captured. When the learning is completed in a desirable way, an image that is the same as the input image may be obtained through the reconstruction of an image with the neural networks from a viewpoint of the input image. When a user attempts to reconstruct an image with a new viewpoint using the trained neural networks, the user may obtain the output image 209 that is three-dimensionally consistent with input images used for learning or training. The desirably, or ideally, reconstructed output image 209 may be the same image obtained by capturing the 3D space with an FOV of an actually corresponding viewpoint.

The models of the electronic device may be classified into an encoder neural network for estimating a 3D scene representation and a scene reconstruction neural network. The scene reconstruction neural network may be included in the neural renderer 280 for reconstructing a 3D scene. The models may not require separate training for each scene.

The electronic device may obtain a plurality of images (e.g., a pair of images). For example, the electronic device may obtain a stereo image. The electronic device may capture a stereo image through a stereo camera (e.g., a camera 1010 of FIG. 10) of the electronic device, but examples are not limited thereto, and the electronic device may obtain an image through communication with an external device.

The encoder neural network may estimate NSR data for representing a 3D scene based on input images. For example, the electronic device may extract a feature map (e.g., a 2D color feature map) from a pair of input images (e.g., a first image 201-1 and a second image 201-2) through the stereo-specific encoder 210. The electronic device may extract pyramid level color feature maps 202 using the stereo-specific encoder 210. The stereo-specific encoder 210 may include a 2D convolutional neural network (CNN). An example of the structure of the stereo-specific encoder 210 will be described below with reference to FIG. 4. The electronic device may generate pyramid level density feature maps 204 using the 3D encoder 230 from a cost volume 203 obtained based on the pyramid level color feature maps 202.

For example, the electronic device may determinatively obtain a plurality of adjacent input images using the stereo camera, and use the input images (e.g., the stereo image). Through the stereo-specific encoder 210, the electronic device may effectively construct the NSR cube 208, an example of which will be described below, from images obtainable through a stereo camera system with a fixed baseline, such as, a multi-camera in a smartphone.

For example, the stereo camera may be a camera in which two camera sensors having the same specifications are disposed in parallel to each other at a fixed distance therebetween. When capturing an image from an arbitrary viewpoint, the stereo camera may easily obtain multiple adjacent images (e.g., two images). In addition, when relative positions between the camera sensors are fixed, the neural network may be trained more stably and efficiently by images obtained through the stereo camera. This is because, for example, the first image 201-1 and the second image 201-2 included in a stereo image have many parts in common. Using the stereo camera may enable the deterministic acquisition of images of adjacent viewpoints, and thus the scene reconstruction neural network which uses adjacent images as an input may operate stably. When relatively fixed input images are input, the electronic device of one or more embodiments may perform training of the neural network more efficiently and stably. For example, the electronic device of one or more embodiments may train a neural network more efficiently and stably with two images generated by image capturing performed at once using a stereo camera including two camera sensors than a typical electronic device that trains a neural network with images obtained by image capturing performed twice with a monocular camera.

In addition, the electronic device of one or more embodiments may apply stereo rectification to obtain parallel input images without distortion. In this case, the input images may correspond to viewpoints that have parallel epipolar lines and are also positioned at the same height in a 3D space. As stereo matching-based depth estimation, a pair of input images may be images captured from viewpoints adjacent to each other, and thus the cost volume 203 may be computed for the 2D feature maps described above. The cost volume 203, which is information corresponding to the depth of a scene, may be a volume from which a matching cost (e.g., a correlation or similarity) between feature maps for each disparity is computed. The cost volume 203 may be computed based on an image of a reference viewpoint. The reference viewpoint may be a viewpoint closest to a new viewpoint at which reconstruction is desired.

The color transformer 250 of the electronic device may perform a color transformation operation on a representative color feature map 205 of the pyramid level color feature maps 202. The density transformer 270 of the electronic device may perform a density transformation operation on a representative density feature map 207 of the pyramid level density feature maps 204.

The NSR data (e.g., an NSR statistical value) estimated by the encoder neural network may be stored as the NSR cube 208. The electronic device may generate a color feature map and a density feature map for each viewpoint based on the encoder neural network, and construct the NSR cube 208. A result of the color transformation operation on the color feature map and the density transformation operation on the density feature map may be data having the same dimension as the NSR cube 208. For example, when the NSR cube 208 has N voxels (or grid cells), a result of each transformation operation for color and density may have N mean values and N density values. In this example, N may be an integer greater than or equal to 1.

For reference, when an additional image of the same 3D space is given, the electronic device may update the NSR cube 208 with a statistical value (e.g., an NSR statistical value) of an NSR feature generated based on the additional image.

The scene reconstruction neural network may reconstruct the output image 209 from the NSR cube 208. For example, the electronic device may determine the NSR data (e.g., an NSR statistical value of a requested point and a view direction) corresponding to a point and view direction requested by a query input from the NSR cube 208. The electronic device may determine a pixel value of a 2D scene image based on the neural renderer 280 from the NSR statistical value. For example, the neural renderer 280 may include a neural network for estimating NSR parameters (e.g., a color value and a density value) from the NSR statistical value and volume rendering for the estimated NSR parameters. The electronic device may reconstruct the output image 209 by determining all pixel values of the scene image of a new viewpoint through the neural renderer 280.

Using the models, the electronic device of one or more embodiments may reconstruct a scene image of a new viewpoint in a 3D space using a relatively small number of images (e.g., at least one pair of images). In addition, the models are trained in advance and only the NSR cube 208 is newly constructed as described above, and thus training the models newly for each scene may be unnecessary, and only a reduced time may be used to reconstruct the scene image of the new viewpoint.

The electronic device of one or more embodiments may immediately construct the NSR cube 208 for a 3D space based on the pre-trained encoder neural network having a structure (e.g., the stereo-specific encoder 210) configured for a stereo camera with a fixed baseline, and reconstruct the output image 209 of a new viewpoint desired by the user based on the scene reconstruction neural network.

Figure 3:
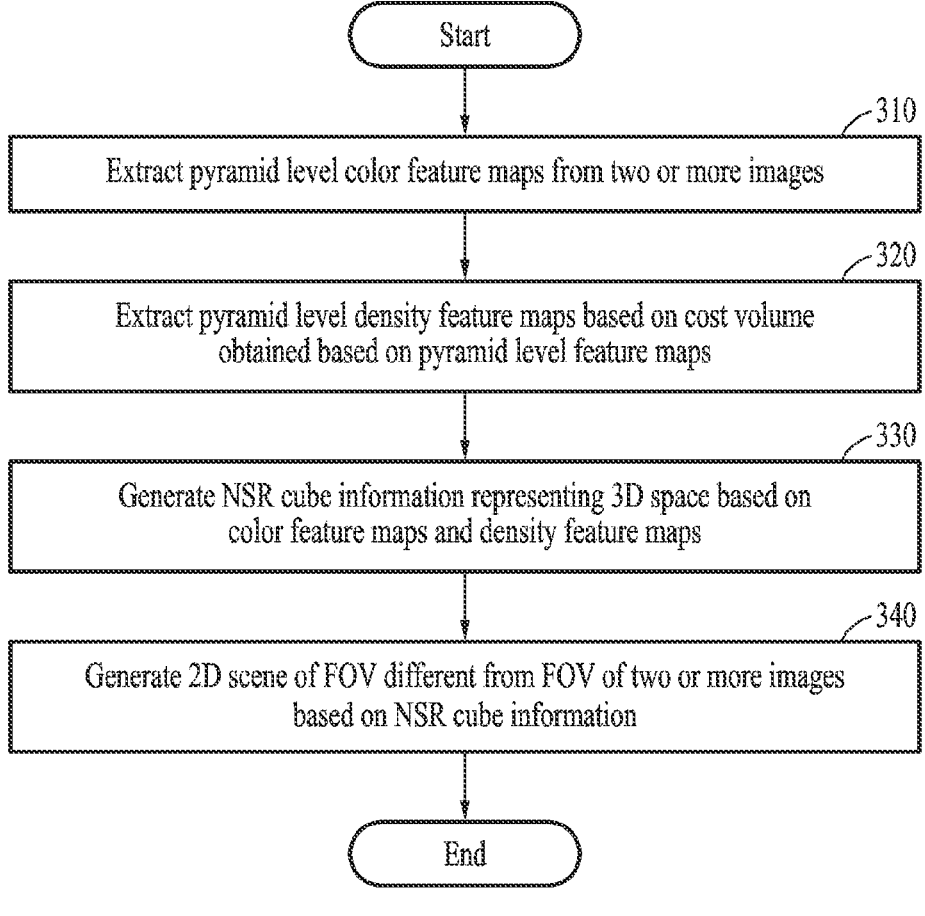
FIG. 3 illustrates an example of an image generation method according to one or more example embodiments.

FIG. 3 illustrates an example of an image generation method according to one or more example embodiments.

In operation 310, the electronic device may extract pyramid level color feature maps from two or more images. For example, the two or more images may be images captured by cameras positioned within a critical distance from each other, and may be images captured by cameras having optical axes parallel to each other. For example, the electronic device may include a stereo camera, and may use the stereo camera to capture a pair of images to obtain the two or more images. The electronic device may receive images captured by an external device including a camera (e.g., a stereo camera) having a plurality of camera sensors directly from the external device or via a network. For reference, an example in which the electronic device inputs a pair of images captured by the stereo camera at an arbitrary image capturing position to a neural network (e.g., an encoder neural network) will be mainly described hereinafter, but examples are not limited thereto. Also, images captured by cameras positioned adjacent to each other and/or positioned on the same baseline may be used.

The electronic device may perform feature extraction on a first image among the two or more images, based on data generated by feature extraction performed on a second image among the two or more images. For example, the first image and the second image may be captured by cameras having optical axes parallel to each other and spaced apart to be adjacent to each other within a critical distance therebetween. Also, feature extraction on the second image may be performed based on the data generated by the feature extraction on the first image. The electronic device may extract a pyramid level color feature map from the first image and extract a pyramid level color feature map from the second image. A stereo-specific encoder may extract a feature map having a richer meaning from input images of the stereo camera. Such color feature map extraction will be described in detail below with reference to FIGS. 4 to 6.

In operation 320, the electronic device may extract pyramid level density feature maps based on a cost volume obtained based on the color feature maps. For example, the electronic device may generate a cost volume of a corresponding pyramid level through cost matching between color feature maps of the same pyramid level among the color feature maps. The electronic device may generate a cost volume for each of the first image (e.g., a left image) and the second image (e.g., a right image). Additionally, the electronic device may generate cost volumes for color feature maps of images of another viewpoint and a color feature map of an image of a reference viewpoint. The electronic device may synthesize the cost volumes generated for respective pyramid levels and generate a density feature map of a corresponding pyramid level based on 3D convolution from the synthesized cost volume.

When generating a cost volume based on each viewpoint, the electronic device may compute a cost volume (e.g., a stereo cost volume) between the reference viewpoint and a viewpoint paired with the reference viewpoint (e.g., when the reference viewpoint is a left viewpoint, the paired viewpoint is a right viewpoint) and a cost volume (e.g., a multi-view cost volume) between the reference viewpoint and another viewpoint. Therefore, using a cost volume based on multiple views in addition to a viewpoint forming a stereo pair with the reference viewpoint, the electronic device may stably generate a cost volume despite an input of images having a relatively great distance therebetween.

In operation 330, the electronic device may generate NSR cube information representing a 3D space based on the color feature maps and the density feature maps. The electronic device may store, in a corresponding voxel position, a statistical value of an NSR feature (e.g., an abstracted value of a color component) based on the color feature maps in the NSR cube and an NSR feature (e.g., an abstracted value of a density component) based on the density feature maps in the NSR cube.

In operation 340, the electronic device may generate a 2D scene having an FOV different from an FOV of the two or more images based on the NSR cube information. The electronic device may obtain an NSR statistical value of a voxel position requested by the query input of the NSR cube information. The electronic device may generate NSR parameters (e.g., a color value and a density value of the corresponding voxel position and view direction) based on a neural renderer from the view direction and the NSR statistical value. The electronic device may compute the NSR parameters for voxel positions according to a view direction corresponding to a pixel and perform volume rendering on the computed NSR parameters to determine a pixel value. The electronic device may reconstruct a new 2D scene image by determining pixel values of all pixels belonging to the 2D scene.

The electronic device of one or more embodiments may reconstruct an image of a new viewpoint using a scene reconstruction neural network from the NSR cube information without inference using an encoder neural network.

Figure 4:
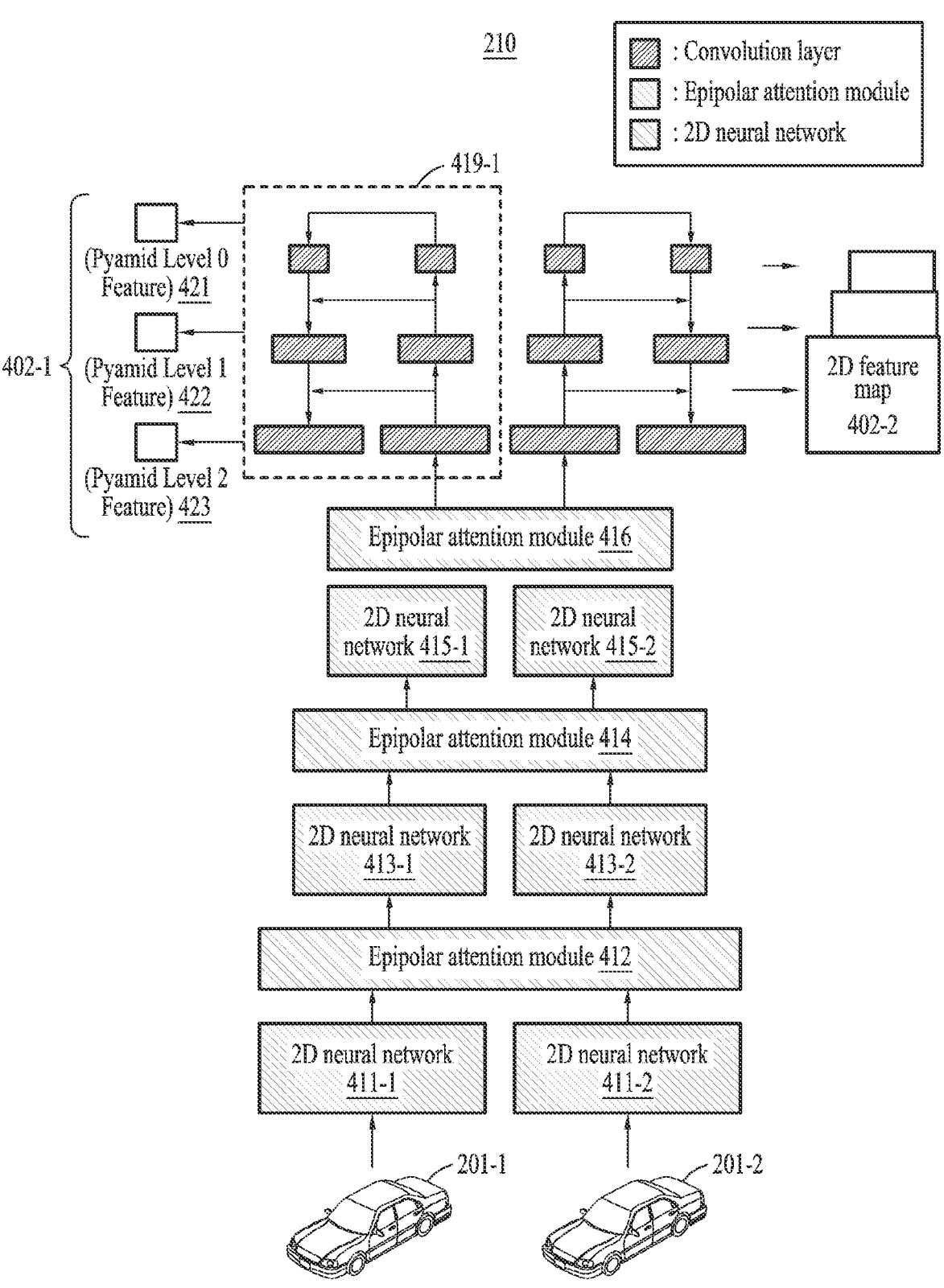
FIG. 4 illustrates an example of a stereo-specific encoder according to one or more example embodiments.

FIG. 4 illustrates an example of a stereo-specific encoder according to one or more example embodiments.

The stereo-specific encoder 210 may include a feature extraction network for extracting a color feature map from each image. Based on the stereo-specific encoder, the electronic device may extract feature maps corresponding to a plurality of pyramid levels for each of a plurality of images (e.g., a pair of images). For example, when two images are given and there are three pyramid levels, six feature maps (e.g., 2×3=6) may be extracted. In the example of FIG. 4, an extracted feature map may be a feature map associated with color and may be referred to as a color feature map. The color feature map may be a map representing a feature value of abstracted color information.

The stereo-specific encoder 210 shown in FIG. 4 may include a color feature extraction network for extracting a color feature map from an image. The color feature extraction network may include a first feature extraction network for extracting first color feature maps from the first image 201-1 and a second feature extraction network for extracting second color feature maps from the second image 201-2. Each color feature extraction network may include a plurality of 2D neural networks and a feature pyramid network 419-1 and may be connected to other feature networks through epipolar attention modules.

The electronic device may refine a feature map of a layer of the first feature extraction network for the first image 201-1 by referring to a feature map of a layer of the second feature extraction network for the second image 201-2, and generate a feature map to be propagated to a subsequent layer of the first feature extraction network. For example, feature extraction using the first feature extraction network may be performed with reference to data propagated from the second feature extraction network. Similarly, feature extraction using the second feature extraction network may be performed with reference to data propagated from the first feature extraction network. Each feature extraction network may generate a feature map by propagating data refined using attention data (e.g., attention data based on epipolar lines) based on data propagated from the two feature extraction networks.

The first feature extraction network may include 2D neural networks 411-1, 413-1, and 415-1 and the second feature extraction network may include 2D neural networks 411-2, 413-2, and 415-2. The electronic device may extract a feature map from the first image 201-1 based on 2D neural networks 411-1, 413-1, and 415-1 of the first feature extraction network. The 2D neural networks 411-1, 413-1, and 415-1 may each have a 2D convolution filter, for example. The electronic device may perform an attention mechanism based on epipolar lines while propagating the first image 201-1 to the plurality of 2D neural networks 411-1, 413-1, and 415-1. For example, an epipolar attention module 412 may perform attention based on an output of the 2D neural network 411-1 of the first feature extraction network and an output of a 2D neural network 411-2 of the second feature extraction network. When the first image 201-1 and the second image 201-2 are stereo images, the first image 201-1 and the second image 201-2 may have epipolar lines parallel to each other and positioned at the same height when stereo alignment is performed. As described above, the epipolar attention module 412 may generate the attention data based on the output of the 2D neural network 411-1 and the output of the 2D neural network 411-2. The electronic device may refine the output of the 2D neural network 411-1 based on the attention data in the epipolar attention module and propagate it to the subsequent 2D neural network 413-1. Similarly, the electronic device may refine the output of the 2D neural network 411-2 based on the attention data and propagate it to a subsequent 2D neural network 413-2 of the second feature extraction network. For example, the attention data may include information that efficiently and stably supplements insufficient information of a feature map along an epipolar line and information that further reinforces important information. An example of the epipolar attention modules will be described below with reference to FIG. 6.

The electronic device may propagate outputs that are refined in a similar way as described above from the outputs of other 2D neural networks 413-1, 415-1, 413-2, and 415-2 based on epipolar attention modules 414 and 416.

The electronic device may extract a color feature map for each pyramid level based on the feature pyramid network 419-1 from the outputs of the feature extraction networks. The feature pyramid network 419-1 may include a convolution layer (e.g., a 3×3 convolution layer shown in FIG. 4) corresponding to each pyramid level. The electronic device may generate a bottom-up feature map corresponding to each pyramid level by sequentially performing downsampling in the feature pyramid network 419-1 through the convolution layer. The electronic device may generate a top-down feature map corresponding to each pyramid level by sequentially performing upsampling from a feature map of the lowest semantic level through the convolution layer. The electronic device may merge the bottom-up feature map and the top-down feature map corresponding to each pyramid level to obtain a color feature map of a corresponding pyramid level. FIG. 4 shows color feature maps 402-1 of three levels, including a zeroth (0th) pyramid level feature map 421, a first pyramid level feature map 422, and a second pyramid level feature map 423, for the first image 201-1. Similarly, the electronic device may also generate color feature maps 402-2 for the second image 201-2.

Although an example in which the first image 201-1 and the second image 201-2 of paired stereo images are input is mainly described herein, examples are not limited thereto. For example, the first image 201-1 and the second image 201-2 may be images captured from different viewpoints having different baselines. That is, an optical axis of a camera capturing the first image 201-1 and an optical axis of a camera capturing the second image 201-2 may not be parallel. In addition, although an example in which two images are input is mainly described herein, examples are not limited thereto, and three or more images may be input. For example, when obtaining a plurality of images, for example, three or more images, the electronic device may select two images from among the plurality of images. The electronic device may apply an operation based on an encoder neural network to the selected two images. The electronic device may apply the operation based on the encoder neural network to each of combinations of the two images selected from the plurality of images. The electronic device may integrate statistical values of NSR features generated for each selected combination of the images and construct an NSR cube for the obtained plurality of images. When viewpoints from which the plurality of images are captured are adjacent to each other and the viewpoints are positioned on the same baseline, the construction of the NSR cube may be performed more stably.

Figure 5:
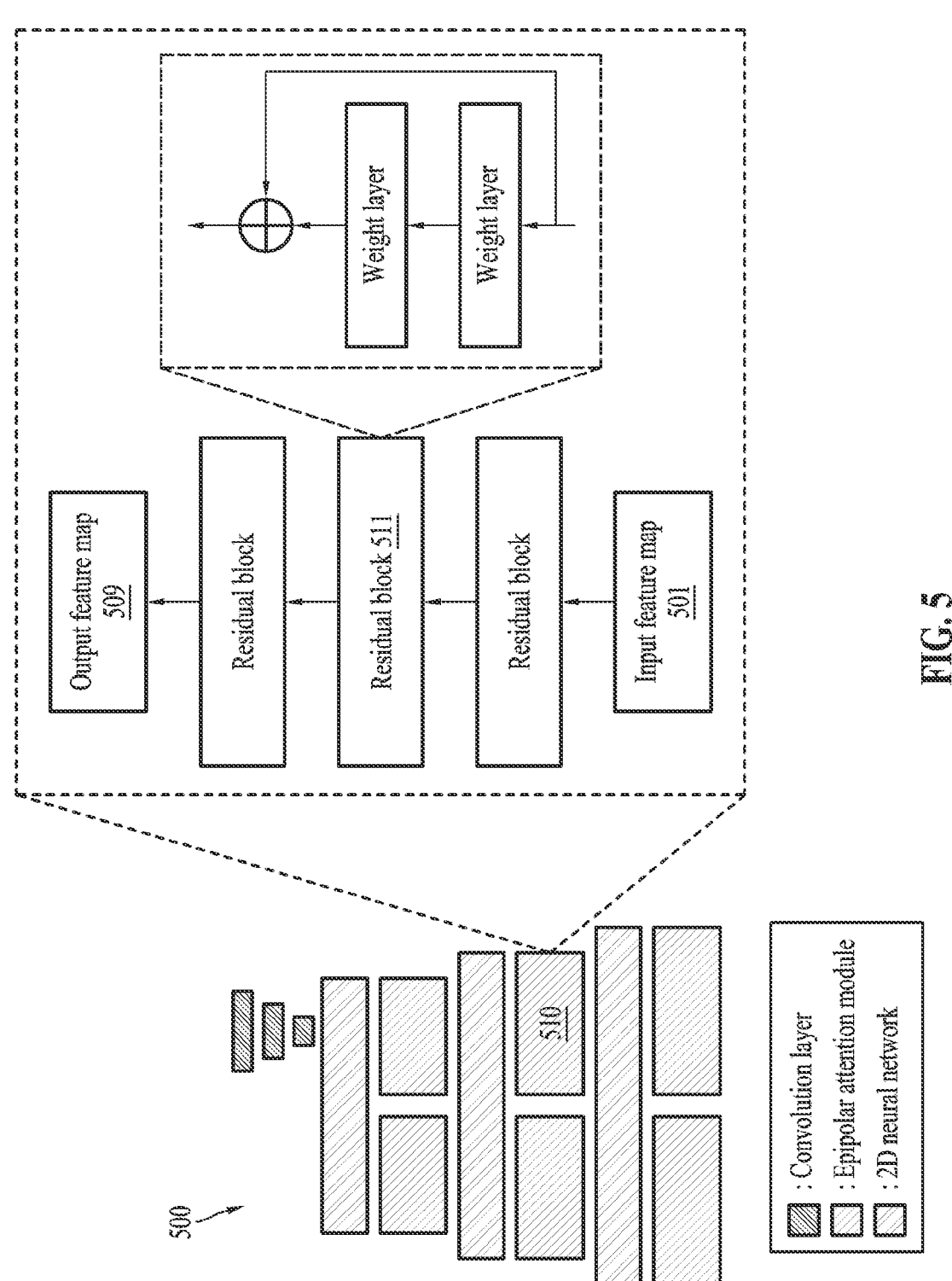
FIG. 5 illustrates an example of a two-dimensional (2D) neural network of a stereo-specific encoder according to one or more example embodiments.

FIG. 5 illustrates an example of a 2D neural network of a stereo-specific encoder according to one or more example embodiments.

In a stereo-specific encoder 500, a 2D neural network 510 may include one or more convolution layers. The electronic device may extract a feature map from data propagated from a previous network (or a previous layer) of the 2D neural network 510 and transmit the extracted feature map to a subsequent network (or a subsequent layer). As described above with reference to FIG. 4, the electronic device may refine an output of the 2D neural network 510 based on an epipolar attention module and transmit the refined output to the subsequent network.

The 2D neural network 510 may include one or more residual blocks 511. Although three residual blocks are shown in FIG. 5, the number of residual blocks is not limited thereto. The residual blocks 511 may each include a main path including one or more weight layers and a shortcut connection. For example, a weight layer may be a convolution layer. The electronic device may merge (e.g., add) data input to the residual blocks 511 through the shortcut connection into (or to) a result of passing the data input to the residual blocks 511 through one or more weight layers of the main path. The electronic device may generate an output feature map 509 by applying an operation based on the residual blocks 511 to an input feature map 501 input to the 2D neural network 510.

The electronic device may transmit, to the subsequent 2D neural network 510, a refined feature map obtained by refining the output feature map 509 using the epipolar attention module, an example of which will be described below with reference to FIG. 6.

Figure 6:
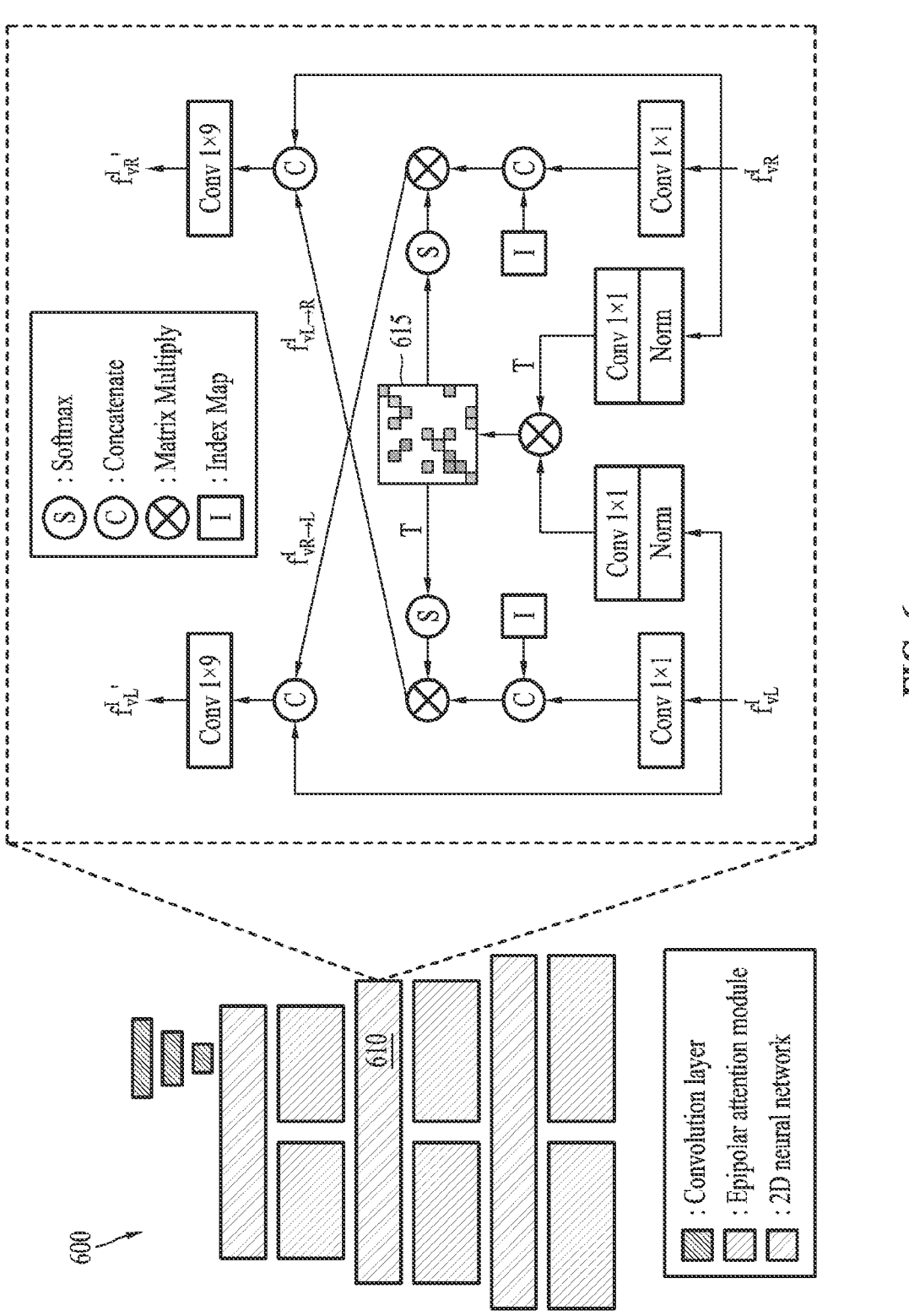
FIG. 6 illustrates an example of an epipolar attention module of a stereo-specific encoder according to one or more example embodiments.

FIG. 6 illustrates an example of an epipolar attention module of a stereo-specific encoder according to one or more example embodiments.

According to an example embodiment, the electronic device may refine an output of a 2D neural network based on an epipolar attention module 610. The electronic device may propagate a refined output feature map to a subsequent 2D neural network.

The electronic device may generate an epipolar attention map 615 based on a feature map of a layer of a first feature extraction network and a feature map of a layer of a second feature extraction network. For example, the electronic device may generate attention data (e.g., the epipolar attention map 615) based on results obtained by applying a normalization operation (e.g., Norm) and a convolution operation (e.g., Conv 1×1) to a first feature map $$f_{v_L}^l$$

of the layer of the first feature extraction network and a second feature map $$f_{v_R}^1$$

of the layer of the second feature extraction network, respectively. The electronic device may obtain the epipolar attention map 615 by applying a matrix multiplication between a transpose of a result of applying the normalization operation (Norm) and the convolution operation (Conv 1×1) to the second feature map $$f_{v_R}^1$$

and a result of applying the normalization operation (Norm) and the convolution operation (Conv 1×1) to the first feature map $$f_{v_L}^l.$$

The first feature map $$f_{v_L}^l$$

may be an output of an lth 2D neural network for a first image (e.g., a left image). The second feature map $$f_{v_R}^1$$

may be an output of the lth 2D neural network for a second image (e.g., a right image). The electronic device may generate feature maps for a subsequent layer of the first feature extraction network and a subsequent layer of the second feature extraction network based on the epipolar attention map 615. For example, the electronic device may concatenate an index map and a result obtained by applying the convolution operation to the second feature map $$f_{v_R}^1,$$

and may perform a matrix multiplication between a concatenation result obtained by the concatenation and a softmax result of the epipolar attention map 615. The electronic device may obtain a refined first feature map $$f_{v_L}^l{}'$$

from the first feature map $$f_{v_L}^l$$

by applying a convolution operation (Conv 1×9) to a concatenation of a result of the matrix multiplication and the first feature map $$f_{v_L}^l.$$

Similarly, the electronic device may concatenate the index map and a result obtained by applying the convolution operation to the first feature map $$f_{v_L}^l,$$

and may perform a matrix multiplication between a concatenation result obtained by the concatenation and a softmax result of the epipolar attention map 615. The electronic device may obtain a refined second feature map $$f_{v_R}^l{}'$$

from the second feature map $$f_{v_R}^1$$

by applying a convolution operation (Conv 1×9) to a concatenation of a result of the matrix multiplication and the second feature map $$f_{v_R}^1.$$

The index map, which is a map of indices according to a horizontal axis (e.g., an x-axis) in an image, may indicate indices from 0 to 999 when the horizontal resolution of the image is 1000.

The electronic device may propagate the feature maps $$(f_{v_L}^{i}{}', f_{v_R}^{i}{}')$$

refined by the epipolar attention operation described above to the subsequent 2D neural network. The electronic device may repeat the operations described with reference to FIGS. 5 and 6 in the stereo-specific encoder 600 to generate a color feature map for each pyramid level.

For reference, although the foregoing description focuses on the operations of the stereo-specific encoder 600 for two images, examples are not limited thereto, and the electronic device may operate the stereo-specific encoder 600 for three or more images. For example, when performing epipolar attention on three or more images, the electronic device may perform feature extraction on a first image among the three or more images by referring to feature extraction performed on a second image and a third image among the three or more images. In this example, a first feature map, a second feature map, and a third feature map may represent feature maps extracted by the feature extraction processes performed on the first image, the second image, and the third image, respectively. The electronic device may obtain a refined first feature map and a refined second feature map by applying the epipolar attention module 610 described above to the first feature map and the second feature map. Similarly, the electronic device may obtain a refined second feature map and a refined third feature map by applying the epipolar attention module 610 described above to the second feature map and the third feature map. The electronic device may obtain a refined third feature map and a refined first feature map by applying the epipolar attention module 610 described above to the third feature map and the first feature map. Accordingly, using the epipolar attention module 610, the electronic device may generate the epipolar attention map 615 for each combination of feature maps corresponding to a plurality of images and refine feature maps of a corresponding combination based on the epipolar attention map 615.

As described above, a plurality of refined results may be generated for the same feature map, and the electronic device may merge the plurality of refined results (e.g., two refined second feature maps in the foregoing example) to obtain a refined result (e.g., a single refined result for the second feature map), and may then transmit the refined result to a subsequent 2D neural network. For example, the electronic device may perform the merging by applying an operation that is based on an additional neural network (e.g., a convolution layer) to refined feature maps. However, examples are not limited thereto, and the electronic device may generate, as the single refined result, a map having a mean of individual element values of the refined feature maps.

Figure 7:
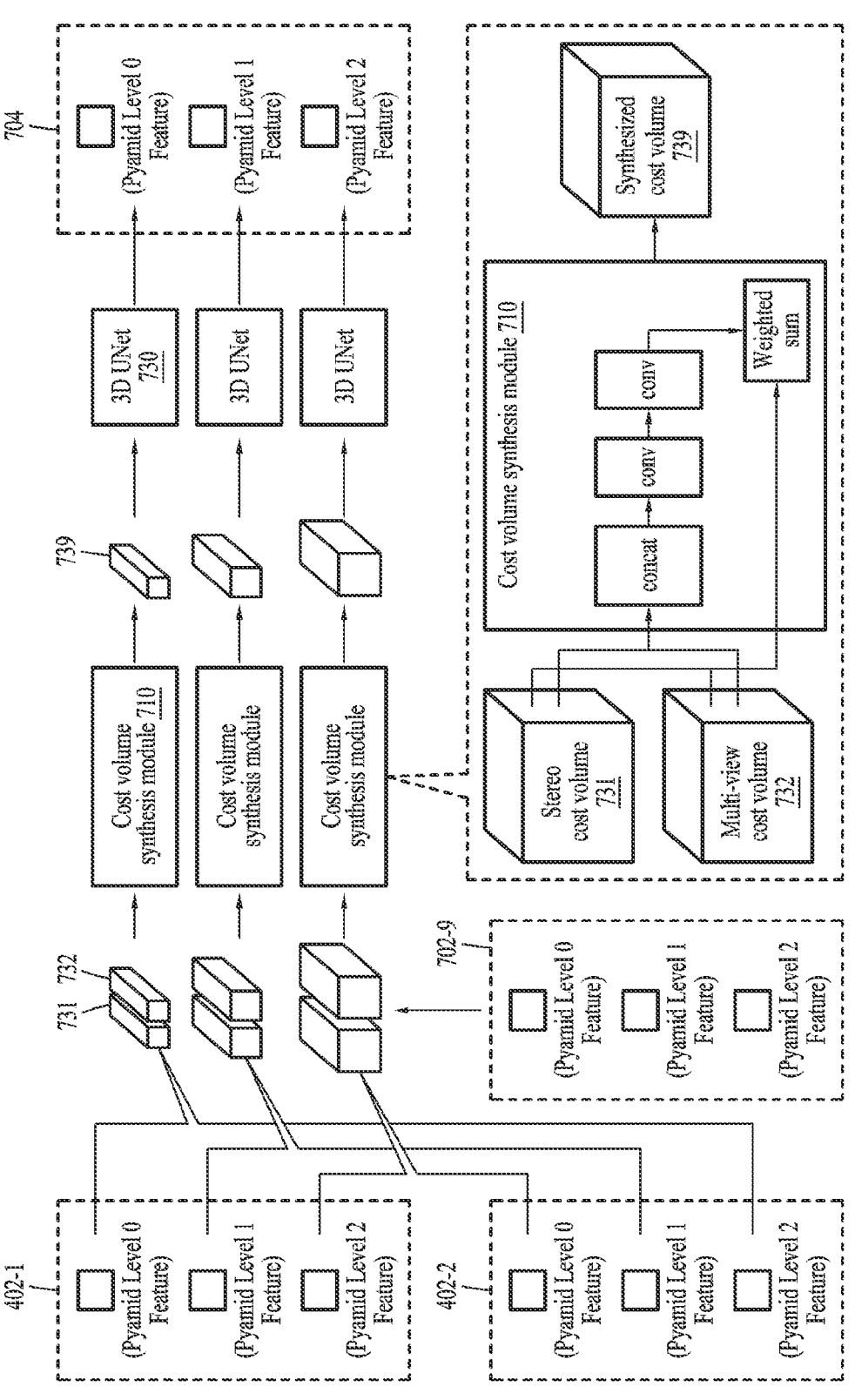
FIG. 7 illustrates an example operation of a three-dimensional (3D) encoder according to one or more example embodiments.

FIG. 7 illustrates an example operation of a 3D encoder according to one or more example embodiments.

According to an example embodiment, the electronic device may generate pyramid level density feature maps 704 based on a 3D encoder from previously generated pyramid level color feature maps. For example, FIG. 7 illustrates an example of generating density feature maps 704 for a first viewpoint (e.g., a left viewpoint) which is a reference viewpoint, but the density feature maps 704 may also be generated for a second viewpoint (e.g., a right viewpoint) in a similar or same way.

For example, the electronic device may generate a cost volume (e.g., a stereo cost volume 731) based on a correlation for each pyramid level between the color feature maps extracted from the first image and the color feature maps extracted from the second image. The cost volume may refer to data generated based on matching or comparing intensities for each disparity of feature maps extracted from images, and the cost volume may include information to be used to estimate a depth.

In the example of FIG. 7, the electronic device may generate three stereo cost volumes 731 based on matching, the matching being for the same pyramid level, three first color feature maps 402-1 extracted from the first image and three second color feature maps 402-2 extracted from the second image. In this example, each stereo cost volume 731 may be generated based on the reference viewpoint.

The electronic device may also generate a cost volume (e.g., a multi-view cost volume 732) between the reference viewpoint and another viewpoint. The electronic device may convert feature maps 702-9 of the other viewpoint based on the reference viewpoint through a homography warping operation. The electronic device may generate the multi-view cost volume 732 based on matching between the converted feature map of the other viewpoint (e.g., a color feature map of an arbitrary pyramid level) and a feature map of the reference viewpoint (e.g., a color feature map of the pyramid level). The electronic device may generate multi-view cost volumes 732 for respective pyramid levels.

For reference, to generate the stereo cost volume 731 or the multi-view cost volume 732, feature maps of adjacent viewpoints may be used. This is because, when a feature map of an arbitrary viewpoint is converted into the reference viewpoint, a converted feature map and a feature map of the reference viewpoint may overlap. As described above, the electronic device may determinatively obtain feature maps of viewpoints adjacent to each other through stereo images. Even when the image capturing positions of a stereo camera are relatively far, the electronic device of one or more embodiments may stably generate a cost volume at each viewpoint because viewpoints of a stereo image captured by the stereo camera are deterministically adjacent to each other. For example, when capturing an image at a plurality of image capturing positions in the same 3D space using a stereo camera, the electronic device may generate the stereo cost volume 731 for paired images, and the electronic device may generate the multi-view cost volume 732 in consideration of an image at a different image capturing position.

When feature maps of three or more viewpoints are given, the electronic device may generate a cost volume using feature maps of some of the viewpoints rather than using all the viewpoints. This is because, when the viewpoints used to generate the cost volume are too far away, feature maps of such distant viewpoints may cause inaccurate calculation or computation of the cost volume. A stereo cost volume may be generated preferentially for feature maps of two viewpoints corresponding to a stereo image. The multi-view cost volume 732 between another viewpoint and the reference viewpoint may be additionally referred to.

The electronic device may synthesize the stereo cost volume 731 and the multi-view cost volume 732 for each pyramid level based on a cost volume synthesis module 710 to generate a synthesized cost volume 739. The electronic device may obtain a weight through concatenation and convolution performed on the stereo cost volume 731 and the multi-view cost volume 732 by the cost volume synthesis module 710. The electronic device may generate the synthesized cost volume 739 that is a weighted sum of the stereo cost volume 731 and the multi-view cost volume 732, using the obtained weight. The electronic device may generate the synthesized cost volume 739 for each pyramid level. The synthesized cost volume 739 may include stably desirable depth information.

The electronic device may generate a density feature map for a corresponding pyramid level based on the cost volume. The electronic device may generate a density feature map based on a 3D neural network 730 (e.g., a 3D CNN) from the synthesized cost volume 739. The 3D CNN may be a 3D U-net, for example. The electronic device may generate a density feature map for each pyramid level. For reference, in the example of FIG. 7, a density feature map may be generated with a first viewpoint as the reference viewpoint, and the electronic device may also generate a density feature map with another viewpoint (e.g., a second viewpoint) as the reference viewpoint.

Figure 8:
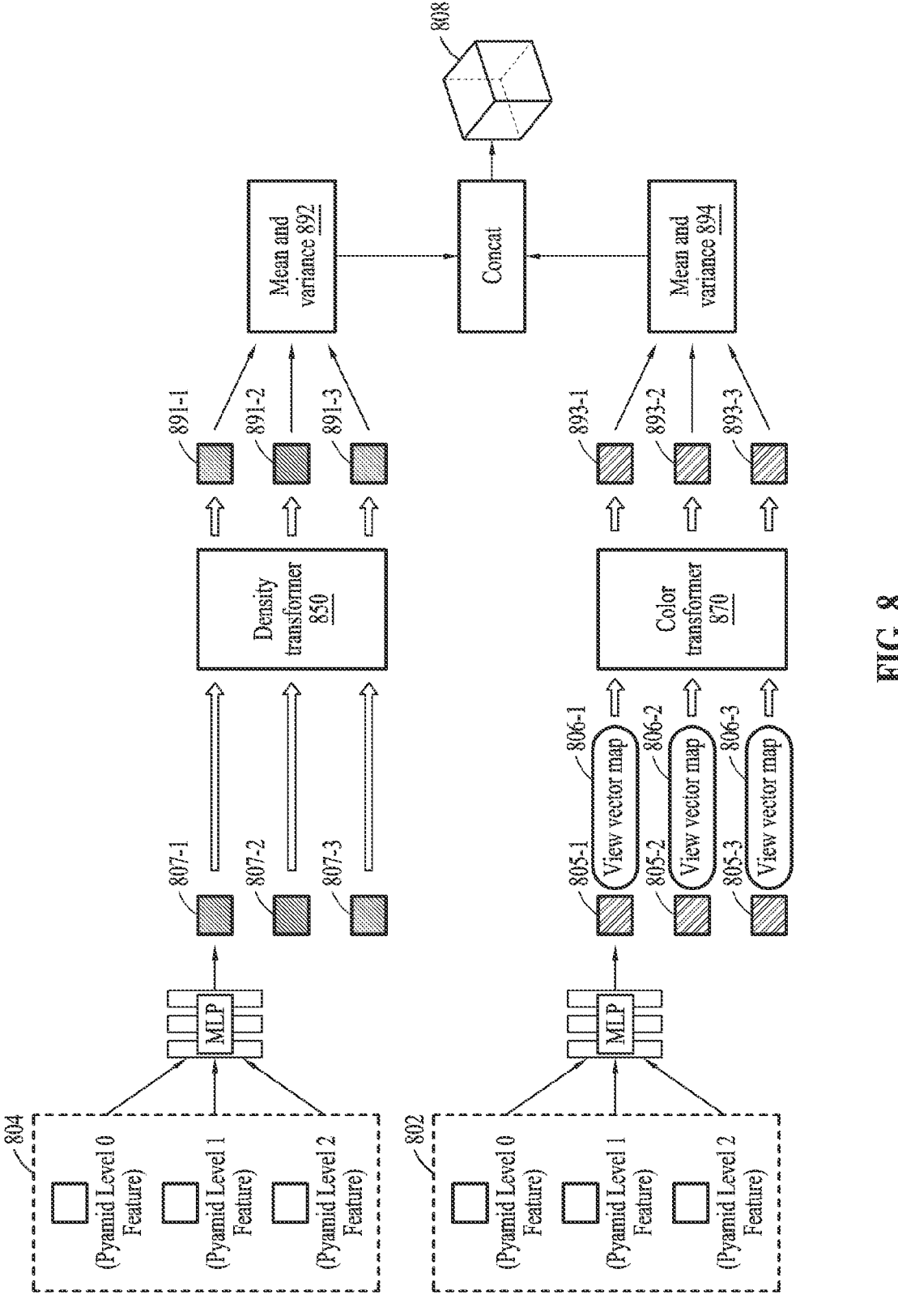
FIG. 8 illustrates an example of NSR cube construction based on a color feature map and a density feature map according to one or more example embodiments.

FIG. 8 illustrates an example of NSR cube construction based on a color feature map and a density feature map according to one or more example embodiments.

According to an example embodiment, the electronic device may generate NSR cube information 808 based on color feature maps (e.g., pyramid level color feature maps 802) and density feature maps (e.g., pyramid level density feature maps 804) that are generated for a plurality of viewpoints. For example, the electronic device may generate the NSR cube information 808 by storing NSR statistical values of the color feature maps 802 and the density feature maps 804 extracted from images of the plurality of viewpoints in the same 3D space, in each position in the 3D space.

For example, the electronic device may extract a representative density feature map 807-1 based on an additional neural network from the density feature maps 804 for respective pyramid levels for an arbitrary viewpoint. That is, for example, a plurality of density feature maps 804 of a first viewpoint may be integrated into the representative density feature map 807-1. The representative density feature map 807-1 of an arbitrary viewpoint may be a density feature map that represents the corresponding viewpoint. The electronic device may also extract representative density feature maps 807-2 and 807-3 for other viewpoints. The electronic device may extract NSR features 891-1, 891-2, and 891-3 for a density component based on a density transformer 850 for respective representative density feature maps. The density transformer 850 may include a well-known transformer network. However, examples are not limited to the density transformer 850, but other machine learning models designed and trained to extract NSR features from a representative density feature map (e.g., the representative density feature map 807-1) may also be used. The electronic device may calculate a mean and variance 892 of the NSR features 891-1, 891-2, and 891-3 for the density component. Each NSR feature of the density component may have the same number of element values as the number of voxels (or grid cells) corresponding to the 3D space. For example, when each NSR feature is a vector having N elements, the electronic device may calculate a mean and a variance of NSR feature values of M viewpoints for each of the N elements. That is, the electronic device may calculate a mean value and a variance value of NSR features for each of the N voxels from the M NSR features extracted from the density transformer 850. In this example, N and M may be an integer greater than or equal to 1. As described above, an NSR feature for the density component may be an abstracted density value.

Similarly, the electronic device may extract a representative color feature map 805-1 based on an additional neural network from the color feature maps 802 for each pyramid level for an arbitrary viewpoint. That is, for example, a plurality of color feature maps 802 for a first viewpoint may be integrated into the representative color feature map 805-1. The representative color feature map 805-1 of an arbitrary viewpoint may be a color feature map that represents the corresponding viewpoint. The electronic device may also extract representative color feature maps 805-2 and 805-3 for other viewpoints. Unlike the foregoing description of the density, color may be dependent on a view direction. Accordingly, the electronic device may extract NSR features 893-1, 893-2, and 893-3 for a color component based on a color transformer 870 for respective representative color feature maps together with corresponding view vector maps 806-1, 806-2, and 806-3. The view vector maps 806-1, 806-2, and 806-3 may be maps of view vectors indicating view directions that respectively correspond to elements of the representative color feature map 805-1. The color transformer 870 may include a well-known transformer network.

However, examples are not limited to the color transformer 870, and other machine learning models designed and trained to extract NSR features for the color component from a representative color feature map (e.g., the representative color feature map 805-1) and a view vector map (e.g., the view vector map 806-1) may also be used. An NSR feature for the color component obtained based on the color transformer 870 may be an abstracted value of the color component in all view directions. The electronic device may calculate a mean and variance 894 of the NSR features 893-1, 893-2, and 893-3 for the color component. Each NSR feature for the color component may have the same number of element values as the number of voxels (or grid cells) corresponding to the 3D space. For example, when each NSR feature is a vector having N elements, the electronic device may calculate a mean and a variance of NSR feature values of M viewpoints for each of the N elements. That is, the electronic device may calculate a mean value and a variance value of NSR features for each of the N voxels from the M NSR features extracted from the color transformer 870. In this example, N and M may each be an integer greater than or equal to 1.

The electronic device may obtain NSR statistical values by concatenating the NSR mean and variance 892 for the density component and the NSR mean and variance 894 for the color component. For example, the electronic device may calculate and store an NSR statistical value (e.g., mean and variance) for the color component and an NSR statistical value (e.g., mean and variance) for the density component, for each of N voxels, and generate the NSR cube information 808. The electronic device may store the generated NSR cube information 808 in a memory. The NSR cube information 808 may be used for scene reconstruction, an example of which will be described below with reference to FIG. 9.

Figure 9:
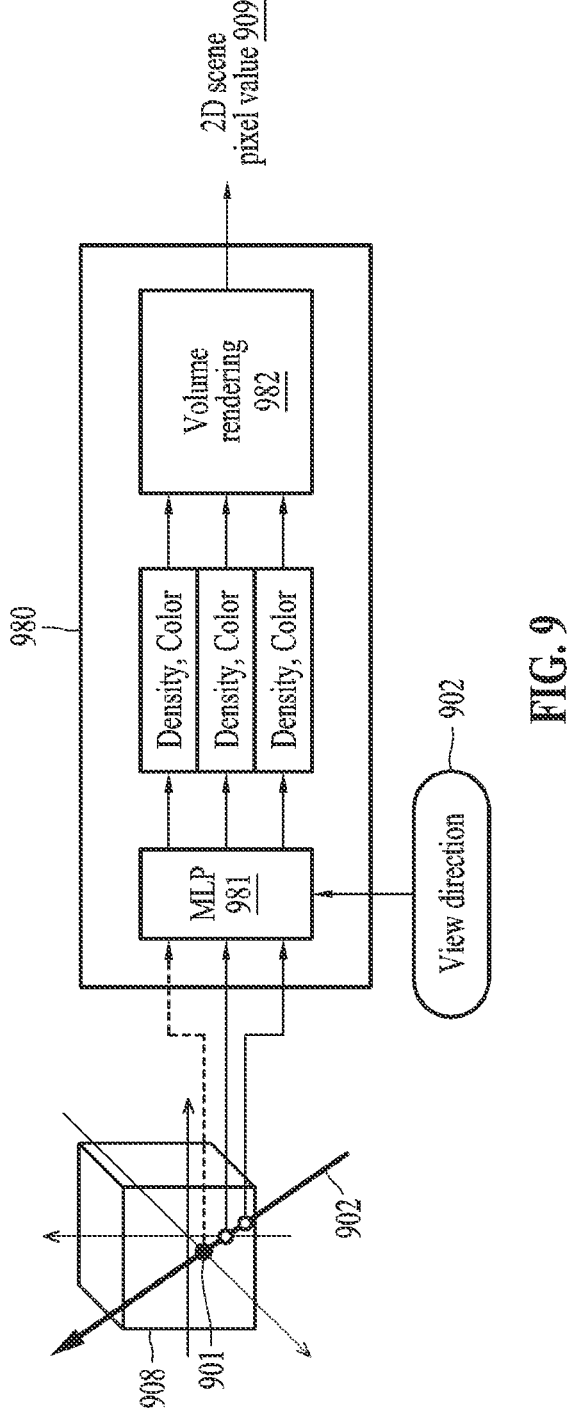
FIG. 9 illustrates an example of generating a scene image using a constructed NSR cube according to one or more example embodiments.

FIG. 9 illustrates an example of generating a scene image using a constructed NSR cube according to one or more example embodiments.

According to an example embodiment, the electronic device may reconstruct a scene image based on a neural renderer 980 from NSR cube information 908. The neural renderer 980 may include a model (e.g., an NSR estimation network) for inferring NSR parameters from the NSR cube information 908, and volume rendering 982. For example, the electronic device may obtain an NSR parameter from the NSR cube information 908 for each of positions in a 3D space along a view direction 902 from a pixel of the 2D scene. The electronic device may determine the pixel and the view direction 902 of the 2D scene to be reconstructed. The view direction 902 may be a direction toward the pixel from a viewpoint corresponding to the 2D scene. The electronic device may determine sample points 901 in the 3D space along the view direction 902. The electronic device may obtain an NSR statistical value corresponding to each sample point from the NSR cube information 908. The electronic device may provide, as a query input, the NSR statistical value and the view direction 902 to the NSR estimation network. The NSR estimation network may be a machine learning network that is designed and trained to output NSR parameters (e.g., a density value and a color value) from statistical values of NSR features (e.g., a mean and a variance for a density component, and a mean and a variance for a color component) and the view direction 902, and may include an MLP 981, for example.

The electronic device may determine a pixel value of the pixel by performing the volume rendering 982 based on the NSR parameters of the positions in the 3D space along the view direction 902. The electronic device may perform the volume rendering 982 using NSR parameters calculated for the same pixel. The volume rendering 982 may include an operation of accumulating color information and volume densities according to the view direction 902. The electronic device may determine pixel information corresponding to the view direction 902 by accumulating the color information and the volume densities calculated for the sample points 901 along the view direction 902. The pixel information may include a color value as a pixel value 909 of the 2D scene corresponding to the pixel.

The electronic device may reconstruct the 2D scene by performing the volume rendering 982 on pixels of the 2D scene. For example, the electronic device may determine pixel values (e.g., color values) of pixels included in a 2D image by performing the volume rendering 982 for each pixel of the image corresponding to the 2D scene. The electronic device may generate the 2D image by obtaining the pixel values for all the pixels.

Accordingly, the electronic device of one or more embodiments may repeatedly reconstruct an image of a new viewpoint without an additional encoder inference process, e.g., by using the NSR cube information 908 stored in the memory.

Figure 10:
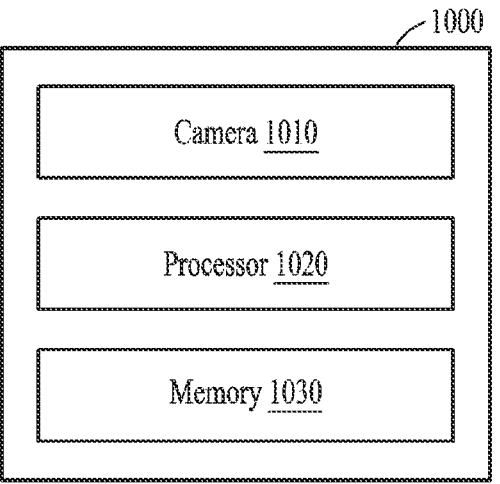
FIG. 10 illustrates an example configuration of an image generation device according to one or more example embodiments.

FIG. 10 illustrates an example configuration of an image generation device according to one or more example embodiments.

According to an example embodiment, the electronic device 1000 may include a camera 1010, a processor 1020 (e.g., one or more processors), and a memory 1030 (e.g., one or more memories).

The camera 1010 may capture two or more images. For example, the camera 1010 may be a stereo camera that captures stereo images. However, examples are not limited thereto, and in the electronic device 1000 implemented as a smartphone, the camera 1010 may include a multi-camera sensor having different optical specifications. For example, cameras of the smartphone may have a fixed baseline, but the size and/or resolution of images captured by the cameras may be different. The processor 1020 may generate images of the same or similar format by preprocessing images captured by different cameras to input the images to a stereo-specific encoder described above. For example, the processor 1020 may apply upsampling to an image having a relatively small size to match it to an image having a relatively large size, or apply downsampling to an image having a large size to match it to adjust the size of the image. Additionally, when the cameras of the smartphone have different focal lengths, angles of view, and image sizes, the configuration of the stereo-specific encoder may be adjusted in consideration of the focal lengths, the angles of view, and the image sizes of the cameras.

For reference, the electronic device 1000 may further include a communication unit (not shown) and receive two or more images through the communication unit (not shown). For another example, the electronic device 1000 may include a communication unit (not shown) without the camera 1010.

The processor 1020 may extract pyramid level color feature maps from the two or more images. The processor 1020 may extract pyramid level density feature maps based on a cost volume obtained based on the color feature maps. The processor 1020 may generate NSR cube information representing a 3D space based on the color feature maps and the density feature maps. The processor 1020 may generate a 2D scene having an FOV different from that of the two or more images based on the NSR cube information. However, operations of the processor 1020 are not limited to the foregoing, and the processor 1020 may also perform at least one of the operations described above with reference to FIGS. 1 to 9.

The memory 1030 may store a neural renderer. As described above with reference to FIG. 9, the neural renderer may include an NSR estimation network and a volume rendering operation. The memory 1030 may also store the stereo-specific encoder. The memory 1030 may store the NSR cube information generated by the processor 1020 through the stereo-specific encoder. The memory 1030 may also store the NSR cube information separately for each 3D space. The memory 1030 may be or include a non-transitory computer-readable storage medium storing instructions that, when executed by the processor 1020, configure the processor 1020 to perform any one, any combination, or all of operations and methods described herein with reference to FIGS. 1-10.

According to an example embodiment, the electronic device 1000 may capture a scene in a 3D space from various viewpoints with the camera 1010 which is a stereo camera, and construct NSR cube information to be used to immediately estimate a 3D scene from the captured images and store the constructed NSR cube information in the memory 1030. For example, the electronic device 1000 may be implemented as a smartphone. In this example, it may be applied to a field of neural network-based immediate estimation of a 3D scene using the camera 1010 which is a multi-camera of the smartphone.

In addition, the electronic device 1000 may estimate a depth based on a multi-view image. The electronic device 1000 may estimate depth information of a viewpoint set by a user based on a cost volume. For example, the electronic device 1000 may estimate depth information from cost volumes based on a depth estimation network. The depth estimation network, which is a network designed and trained to output a depth for a target viewpoint from cost volumes, may include a 3D CNN, for example. The electronic device 1000 may predict an actual distance based on the estimated depth information.

The stereo-specific encoders, 3D encoders, color transformers, density transformers, neural renderers, epipolar attention modules, cost volume synthesis modules, electronic devices, cameras, processors, memories, stereo-specific encoder 210, 3D encoder 230, color transformer 250, density transformer 270, neural renderer 280, epipolar attention modules 412, 414, 416, and 610, cost volume synthesis module 710, density transformer 850, color transformer 870, neural renderer 980, electronic device 1000, camera 1010, processor 1020, memory 1030, and other apparatuses, devices, units, modules, and components disclosed and described herein with respect to FIGS. 1-10 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, comprising:
extracting pyramid level color feature maps, each being extracted from two or more images;
generating a cost volume of a corresponding pyramid level through cost matching between color feature maps of the same pyramid level among the color feature maps;
extracting pyramid level density feature maps based on the cost volume;
generating neural scene representation (NSR) cube information representing a three-dimensional (3D) space based on the color feature maps and the density feature maps; and
generating a two-dimensional (2D) scene of a field of view (FOV) different from a FOV of the two or more images based on the NSR cube information.

2. The method of claim 1, wherein the two or more images are images captured by cameras positioned within a critical distance from each other.

3. The method of claim 1, wherein the two or more images are images captured by cameras having optical axes parallel to each other.

4. The method of claim 1, wherein the extracting of the color feature maps comprises:
performing feature extraction on a first image among the two or more images, based on data generated by feature extraction performed on a second image among the two or more images; and
performing feature extraction on the second image based on the data generated by the feature extraction on the first image.

5. The method of claim 1, wherein the extracting of the color feature maps comprises:
refining a feature map of a layer of a first feature extraction network for a first image using a feature map of a layer of a second feature extraction network for a second image; and
generating a feature map to be propagated to a subsequent layer of the first feature extraction network.

6. The method of claim 5, comprising:
generating an epipolar attention map based on the feature map of the layer of the first feature extraction network and the feature map of the layer of the second feature extraction network; and generating feature maps for the subsequent layer of the first feature extraction network and a subsequent layer of the second feature extraction network based on the epipolar attention map.

7. The method of claim 1, wherein the extracting of the color feature maps comprises:
performing epipolar attention on three or more images comprising the two or more images by performing feature extraction on a first image among the three or more images based on a result of feature extraction performed on a second image among the three or more images and feature extraction performed on a third image among the three or more images.

8. The method of claim 1, wherein the extracting of the density feature maps comprises:
generating a cost volume based on a correlation for each pyramid level between color feature maps extracted from a first image and color feature maps extracted from a second image; and
generating a density feature map for a corresponding pyramid level based on the cost volume.

9. The method of claim 1, wherein the generating of the NSR cube information comprises:
generating the NSR cube information by storing, in each position in the 3D space, an NSR statistical value of color feature maps and density feature maps extracted from images of a plurality of viewpoints in the same 3D space.

10. The method of claim 1, wherein the generating of the 2D scene comprises:
determining an NSR parameter from the NSR cube information for each of positions in the 3D space along a view direction from a pixel of the 2D scene;
determining a pixel value of the pixel by performing volume rendering based on NSR parameters of the positions in the 3D space along the view direction; and
reconstructing the 2D scene by performing volume rendering on pixels of the 2D scene.

11. An electronic device, comprising:
one or more processors configured to:
extract pyramid level color feature maps, each being extracted from two or more images;
generating a cost volume of a corresponding pyramid level through cost matching between color feature maps of the same pyramid level among the color feature maps;
extract pyramid level density feature maps based on the cost volume;
generate neural scene representation (NSR) cube information representing a three-dimensional (3D) space based on the color feature maps and the density feature maps; and
generate a two-dimensional (2D) scene of a field of view (FOV) different from a FOV of the two or more images based on the NSR cube information.

12. The electronic device of claim 11, wherein the two or more images are images captured by either one or both of:
cameras positioned within a critical distance from each other; and
cameras having optical axes parallel to each other.

13. The electronic device of claim 11, wherein, for the extracting of the color feature maps, the one or more processors are configured to:
perform feature extraction on a first image among the two or more images, based on data generated by feature extraction performed on a second image among the two or more images; and perform feature extraction on the second image based on the data generated by the feature extraction on the first image.

14. The electronic device of claim 11, wherein, for the extracting of the color feature maps, the one or more processors are configured to:

refine a feature map of a layer of a first feature extraction network for a first image using a feature map of a layer of a second feature extraction network for a second image; and generate a feature map to be propagated to a subsequent layer of the first feature extraction network.

15. The electronic device of claim 14, wherein the one or more processors are configured to:

generate an epipolar attention map based on the feature map of the layer of the first feature extraction network and the feature map of the layer of the second feature extraction network; and generate feature maps for the subsequent layer of the first feature extraction network and a subsequent layer of the second feature extraction network based on the epipolar attention map.

16. The electronic device of claim 11, wherein, for the extracting of the color feature maps, the one or more processors are configured to:

perform epipolar attention on three or more images comprising the two or more images by performing feature extraction on a first image among the three or more images based on a result of feature extraction performed on a second image and feature extraction performed on a third image among the three or more images.

17. The electronic device of claim 11, wherein, for the extracting of the density feature maps, the one or more processors are configured to:

generate a cost volume based on a correlation for each pyramid level between color feature maps extracted from a first image and color feature maps extracted from a second image; and generate a density feature map for a corresponding pyramid level based on the cost volume.

18. The electronic device of claim 11, wherein, for the generating of the NSR cube information, the one or more processors are configured to:

generate the NSR cube information by storing, in each position in the 3D space, an NSR statistical value of color feature maps and density feature maps extracted from images of a plurality of viewpoints in the same 3D space.

19. The electronic device of claim 11, wherein, for the generating of the 2D scene, the one or more processors are configured to:

determine an NSR parameter from the NSR cube information for each of positions in the 3D space along a view direction from a pixel of the 2D scene;

determine a pixel value of the pixel by performing volume rendering based on NSR parameters of the positions in the 3D space along the view direction; and reconstruct the 2D scene by performing volume rendering on pixels of the 2D scene.

20. A processor-implemented method, comprising:

generating feature maps for a layer of a first feature extraction network and a layer of a second feature extraction network, respectively based on a first image and a second image;

generating an epipolar attention map based on the feature map of the layer of the first feature extraction network and the feature map of the layer of the second feature extraction network;

generating subsequent feature maps for a subsequent layer of the first feature extraction network and a subsequent layer of the second feature extraction network, based on the epipolar attention map;

determining a three-dimensional (3D) space based on the subsequent feature maps; and generating a two-dimensional (2D) scene of a field of view (FOV) different from a FOV of the first image and the second image based on the determined 3D space.

* * * * *